(12) United States Patent
Watanabe et al.

(10) Patent No.: US 12,615,704 B2
(45) Date of Patent: Apr. 28, 2026

(54) X-RAY GENERATION APPARATUS AND X-RAY IMAGING APPARATUS

(71) Applicant: Canon Anelva Corporation, Kawasaki (JP)

(72) Inventors: Hisashi Watanabe, Tokyo (JP); Atsuhiro Kuwajima, Nagano (JP); Takahiro Okada, Tokyo (JP); Takeo Tsukamoto, Nigata (JP)

(73) Assignee: CANON ANELVA CORPORATION, Kanagawa-ken (JP)

( * ) Notice: Subject to any disclaimer, the term of this patent is extended or adjusted under 35 U.S.C. 154(b) by 0 days.

(21) Appl. No.: 19/277,116

(22) Filed: Jul. 22, 2025

(65) Prior Publication Data

US 2025/0351255 A1 Nov. 13, 2025

Related U.S. Application Data

(63) Continuation of application No. PCT/JP2023/033422, filed on Sep. 13, 2023.

(30) Foreign Application Priority Data

Jan. 25, 2023 (WO) .................. PCT/JP2023/002275

(51) Int. Cl.
*H05G 1/06* (2006.01)
*G01N 23/04* (2018.01)
(Continued)

(52) U.S. Cl.
CPC .............. *H05G 1/04* (2013.01); *G01N 23/04* (2013.01); *H01J 35/025* (2013.01);
(Continued)

(58) Field of Classification Search
None
See application file for complete search history.

(56) References Cited

U.S. PATENT DOCUMENTS 5,132,999 A    7/1992 Wirth
7,340,035 B2 *  3/2008 Tang ..................... H01J 35/025
378/111

(Continued)

FOREIGN PATENT DOCUMENTS

EP    3923312 A1    12/2021
EP    3923321 A1    12/2021
(Continued)

OTHER PUBLICATIONS

International Search Report (PCT/ISA/210) and Written Opinion (PCT/ISA/237) both with English translation mailed on Nov. 21, 2023, by the Japanese Patent Office as the International Searching Authority for International Application No. PCT/JP2023/033422, 15 pages.

(Continued)

*Primary Examiner* — Hoon K Song
(74) *Attorney, Agent, or Firm* — BUCHANAN INGERSOLL & ROONEY PC

(57) ABSTRACT

X-ray generation apparatus includes X-ray generation tube having insulating tube with first and second opening ends, cathode closing the first opening end and having electron emitting portion, and anode closing the second opening end; electronic component arranged in proximity to the cathode; driving circuit for driving the X-ray generation tube via the electronic component; and accommodating container accommodating the X-ray generation tube, the electronic component, and the driving circuit. The accommodating container has third opening end, and the X-ray generation tube closes the third opening end. The accommodating container defines first space storing at least part of the driving circuit, and second space protruding from the first space and storing the X-ray generation tube and the electronic component.

17 Claims, 10 Drawing Sheets

(51) Int. Cl.

| | |
|---|---|
| *H01J 35/02* | (2006.01) |
| *H01J 35/06* | (2006.01) |
| *H01J 35/08* | (2006.01) |
| *H01J 35/16* | (2006.01) |
| *H05G 1/04* | (2006.01) |

(52) U.S. Cl.

CPC .......... *H01J 35/064* (2019.05); *H01J 35/112* (2019.05); *H01J 35/16* (2013.01); *H05G 1/06* (2013.01); *G01N 2223/1016* (2013.01); *G01N 2223/204* (2013.01); *H01J 2235/166* (2013.01)

(56) References Cited

U.S. PATENT DOCUMENTS

| | | | |
|---|---|---|---|
| 9,131,590 | B2 | 9/2015 | Suzuki et al. |
| 9,230,774 | B2 | 1/2016 | Yanagisawa et al. |
| 9,282,622 | B2 | 3/2016 | Draper et al. |
| 9,373,478 | B2 | 6/2016 | Tamura et al. |
| 9,653,252 | B2 | 5/2017 | Yanagisawa et al. |
| 9,741,524 | B2 | 8/2017 | Kawase |
| 9,818,571 | B2 | 11/2017 | Shiozawa et al. |
| 9,824,848 | B2 | 11/2017 | Ikarashi |
| 9,831,060 | B2 | 11/2017 | Kawase |
| 9,887,063 | B2 | 2/2018 | Yamazaki et al. |
| 10,381,190 | B2 | 8/2019 | Ikarashi |
| 10,504,679 | B2 | 12/2019 | Ohashi |
| 10,720,299 | B1 | 7/2020 | Ando |
| 10,743,396 | B1 | 8/2020 | Kawase |
| 10,813,203 | B2 | 10/2020 | Kawase et al. |
| 10,969,347 | B2 | 4/2021 | Kawase |
| 11,039,526 | B2 | 6/2021 | Suzuki et al. |
| 11,140,763 | B2 | 10/2021 | Kawase |
| 11,875,965 | B2 | 1/2024 | Ishii |
| 2013/0266119 | A1 | 10/2013 | Taniguchi et al. |
| 2014/0029725 | A1 | 1/2014 | Ueda et al. |
| 2014/0362974 | A1 | 12/2014 | Yanagisawa et al. |
| 2014/0369467 | A1* | 12/2014 | Yamazaki ................. H01J 9/26 156/287 |
| 2015/0098552 | A1 | 4/2015 | Draper et al. |
| 2015/0179387 | A1* | 6/2015 | Onishi ................. H01J 37/248 250/493.1 |
| 2016/0020060 | A1 | 1/2016 | Ohashi et al. |
| 2016/0133429 | A1* | 5/2016 | Kawase ............... H01J 35/186 378/124 |
| 2016/0155598 | A1 | 6/2016 | Shiozawa et al. |
| 2016/0163499 | A1 | 6/2016 | Shimono |
| 2016/0225572 | A1 | 8/2016 | Yanagisawa et al. |
| 2017/0032923 | A1 | 2/2017 | Tsunoda et al. |
| 2018/0182590 | A1 | 6/2018 | Ohashi |
| 2019/0150255 | A1 | 5/2019 | Kawase et al. |
| 2020/0154552 | A1 | 5/2020 | Suzuki et al. |
| 2020/0211808 | A1 | 7/2020 | Ando |
| 2021/0029809 | A1 | 1/2021 | Ishii et al. |
| 2021/0063324 | A1 | 3/2021 | Kawase |
| 2021/0100088 | A1 | 4/2021 | Ishii |
| 2021/0212188 | A1* | 7/2021 | Kawase ............... G01N 23/083 |
| 2024/0306283 | A1 | 9/2024 | Kawase et al. |

FOREIGN PATENT DOCUMENTS

| | | |
|---|---|---|
| JP | H0287500 A | 3/1990 |
| JP | H04319296 A | 11/1992 |
| JP | 2007080568 A | 3/2007 |
| JP | 2011233411 A | 11/2011 |
| JP | 2013101879 A | 5/2013 |
| JP | 2014072158 A | 4/2014 |
| JP | 2014086147 A | 5/2014 |
| JP | 2014139876 A | 7/2014 |
| JP | 2014154423 A | 8/2014 |
| JP | 2015015227 A | 1/2015 |
| JP | 2015028909 A | 2/2015 |
| JP | 2015153548 A | 8/2015 |
| JP | 2016085945 A | 5/2016 |
| JP | 2016095916 A | 5/2016 |
| JP | 2016103451 A | 6/2016 |
| JP | 2016539484 A | 12/2016 |
| JP | 2017016921 A | 1/2017 |
| JP | 2017022037 A | 1/2017 |
| JP | 2018026355 A | 2/2018 |
| JP | 2018073625 A | 5/2018 |
| JP | 2018206676 A | 12/2018 |
| JP | 2018206677 A | 12/2018 |
| JP | 2021022428 A | 2/2021 |
| JP | 7413614 B1 | 1/2024 |
| JP | 7486694 B1 | 5/2024 |
| WO | 2020136911 A1 | 7/2020 |
| WO | 2020213039 A1 | 10/2020 |
| WO | 2021015036 A1 | 1/2021 |
| WO | 2021044524 A1 | 3/2021 |
| WO | 2021044525 A1 | 3/2021 |
| WO | 2024157394 A1 | 8/2024 |
| WO | 2024157530 A1 | 8/2024 |

OTHER PUBLICATIONS

Decision to Grant a Patent mailed Apr. 26, 2024, by the Japan Patent Office for corresponding Application No. 2024-506267, 7 pages including 3 pages of English Translation.

Decision to Grant a Patent mailed on Oct. 21, 2024, by the Japan Patent Office in corresponding Japan Patent Application No. 2024-558176, 5 pages including 3 pages of English Translation.

International Preliminary Report on Patentability (Forms PCT/IB/373 and PCT/ISA/237) issued on Jul. 22, 2025, by the International Bureau of WIPO, in corresponding International Application No. PCT/JP2023/033426, 4 pages.

International Preliminary Report on Patentability (Forms PCT/IPEA/409) issued on Aug. 20, 2024, by the Japanese Patent Office (IPEA/JP), in corresponding International Application No. PCT/JP2023/033425, 4 pages.

International Preliminary Report on Patentability (PCT/IPEA/409) dated Aug. 7, 2024, issued in corresponding International Patent Application No. PCT/JP2023/033423, 17 pages.

International Preliminary Report on Patentability (PCT/IPEA/409) dated Oct. 8, 2024, issued in corresponding International Patent Application No. PCT/JP2023/033420, 16 pages.

International Preliminary Report on Patentability (PCT/IPEA/409) with English translation dated Aug. 20, 2024, 22 pages.

International Preliminary Report on Patentability of the International Searching Authority (Forms PCT/IB/373 and PCT/ISA/237) issued on Jul. 22, 2025, by the International Bureau of WIPO in corresponding International Application No. PCT/JP2024/000981, 7 pages.

International Preliminary Report on Patentability of the International Searching Authority (Forms PCT/IB/373 and PCT/ISA/237) issued on Jul. 22, 2025, by the International Bureau of WIPO in corresponding International Application No. PCT/JP2023/033422, 5 pages.

International Preliminary Report on Patentability of the International Searching Authority (Forms PCT/IB/373 and PCT/ISA/237) issued on Jul. 22, 2025, by the International Bureau of WIPO, in corresponding International Application No. PCT/JP2023/033424, 5 pages.

International Search Report (Form PCT/ISA/210) issued on Mar. 7, 2023, by the Japanese Patent Office (ISA/JP) in corresponding International Application No. PCT/JP2023/002275, 2 pages.

International Search Report (Form PCT/ISA/210) issued on Oct. 15, 2024, by the Japanese Patent Office (ISA/JP) in corresponding International Application No. PCT/JP2024/031346, 2 pages.

International Search Report (PCT/ISA/210) and Written Opinion (PCT/ISA/237) both with English translation mailed Nov. 28, 2023, by the Japanese Patent Office as the International Searching Authority for International Application No. PCT/JP2023/033425, 13 pages.

International Search Report (PCT/ISA/210) and Written Opinion (PCT/ISA/237) with full translation mailed Nov. 28, 2023, by the Japan Patent Office as the International Searching Authority for International Application No. PCT/JP2023/033426, 14 pages.

(56) References Cited

OTHER PUBLICATIONS

International Search Report (PCT/ISA/210) and Written Opinion (PCT/ISA/237) with machine translation mailed on Nov. 21, 2023, by the Japanese Patent Office as the International Searching Authority for International Application No. PCT/JP2023/033423, 14 pages.
International Search Report (PCT/ISA/210) and Written Opinion (PCT/ISA/237) with machine translation mailed on Nov. 28, 2023, by the Japanese Patent Office as the International Searching Authority for International Application No. PCT/JP2023/033424, 12 pages.
International Search Report (PCT/ISA/210) with translation and Written Opinion (PCT/ISA/237) mailed on Dec. 5, 2023, by the Japanese Patent Office as the International Searching Authority for International Application No. PCT/JP2023/033420, 9 pages.
International Search Report (PCT/ISA/210) with translation and Written Opinion (PCT/ISA/237) mailed on Mar. 19, 2024, by the Japanese Patent Office as the International Searching Authority for International Application No. PCT/JP2024/000981, 17 pages.
Office Action issued on Aug. 26, 2025, by the U.S. Patent and Trademark Office in U.S. Appl. No. 19/277,116, 8 pages.
Office Action issued on Jan. 28, 2025, by the U.S. Patent and Trademark Office in U.S. Appl. No. 18/974,437, 18 pages.
Office Action issued on Sep. 30, 2025, by the U.S. Patent and Trademark Office in U.S. Appl. No. 19/276,690, 7 pages.

* cited by examiner

X-RAY GENERATION APPARATUS AND X-RAY IMAGING APPARATUS

CROSS-REFERENCE TO RELATED APPLICATIONS

This application is a Continuation of International Patent Application No. PCT/JP2023/033422, filed Sep. 13, 2023, which claims priority to and the benefit of International Patent Application No. PCT/JP2023/002275 filed on Jan. 25, 2023, the entire disclosures of which are incorporated herein by reference.

BACKGROUND

Field of the Technology

The present disclosure relates to an X-ray generation apparatus and an X-ray imaging apparatus.

Description of the Related Art

PTL 1 describes an X-ray generation apparatus that includes an X-ray generation tube, a tube driving circuit which drives the X-ray generation tube, and an accommodating container which accommodates the X-ray generation tube and the tube driving circuit. The accommodating container is filled with an insulating liquid, and the insulating liquid ensures insulating performance between the X-ray generation tube and the tube driving circuit.

CITATION LIST

Patent Literature

PTL 1: Japanese Patent Laid-Open No. 2016-103451

SUMMARY

When an X-ray generation apparatus is used for a long period, abnormal discharge sometimes occurs in an X-ray generation tube. It has been found by studies of the present inventor that abnormal discharge occurs between the cathode and anode of the X-ray generation tube via the outer surface of an insulating tube. The abnormal discharge may cause the X-ray generation apparatus to stop or fail.

One aspect of the present disclosure provides a technique advantageous in suppressing the occurrence of abnormal discharge in an X-ray generation apparatus.

A first aspect of the present disclosure is directed to an X-ray generation apparatus, and the X-ray generation apparatus comprises: an X-ray generation tube including an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide; an electronic component arranged in proximity to the cathode; a driving circuit configured to drive the X-ray generation tube via the electronic component; and an accommodating container configured to accommodate the X-ray generation tube, the electronic component, and the driving circuit, wherein the accommodating container has a third opening end, and the X-ray generation tube is arranged to close the third opening end, the accommodating container is filled with an insulating liquid, the accommodating container defines a first space storing at least a part of the driving circuit, and a second space protruding from the first space and storing the X-ray generation tube and the electronic component, the accommodating container includes a protrusion portion surrounding the second space, and one end of the second space forms the third opening end, and an outer surface of the cathode and the electronic component are covered with a member arranged spaced apart from the accommodating container.

A second aspect of the present disclosure is directed to an X-ray generation apparatus, and the X-ray generation apparatus comprises: an X-ray generation tube including an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide; a driving circuit configured to drive the X-ray generation tube; and an accommodating container configured to accommodate the X-ray generation tube and the driving circuit, wherein the accommodating container has a third opening end, and the X-ray generation tube is arranged to close the third opening end, the accommodating container is filled with an insulating liquid, the accommodating container defines a first space storing a part of the driving circuit, and a second space protruding from the first space and storing the X-ray generation tube, the accommodating container includes a protrusion portion surrounding the second space, and one end of the second space forms the third opening end, and an outer surface of the cathode and the driving circuit are covered with an insulating member arranged spaced apart from the accommodating container, and the insulating liquid exists between the insulating member and the accommodating container.

A third aspect of the present disclosure is directed to an X-ray imaging apparatus, and the X-ray imaging apparatus comprises: an X-ray generation apparatus defined as the first or second aspect; and an X-ray detector configured to detect X-rays emitted from the X-ray generation apparatus.

DESCRIPTION OF EMBODIMENTS

Figure 1:
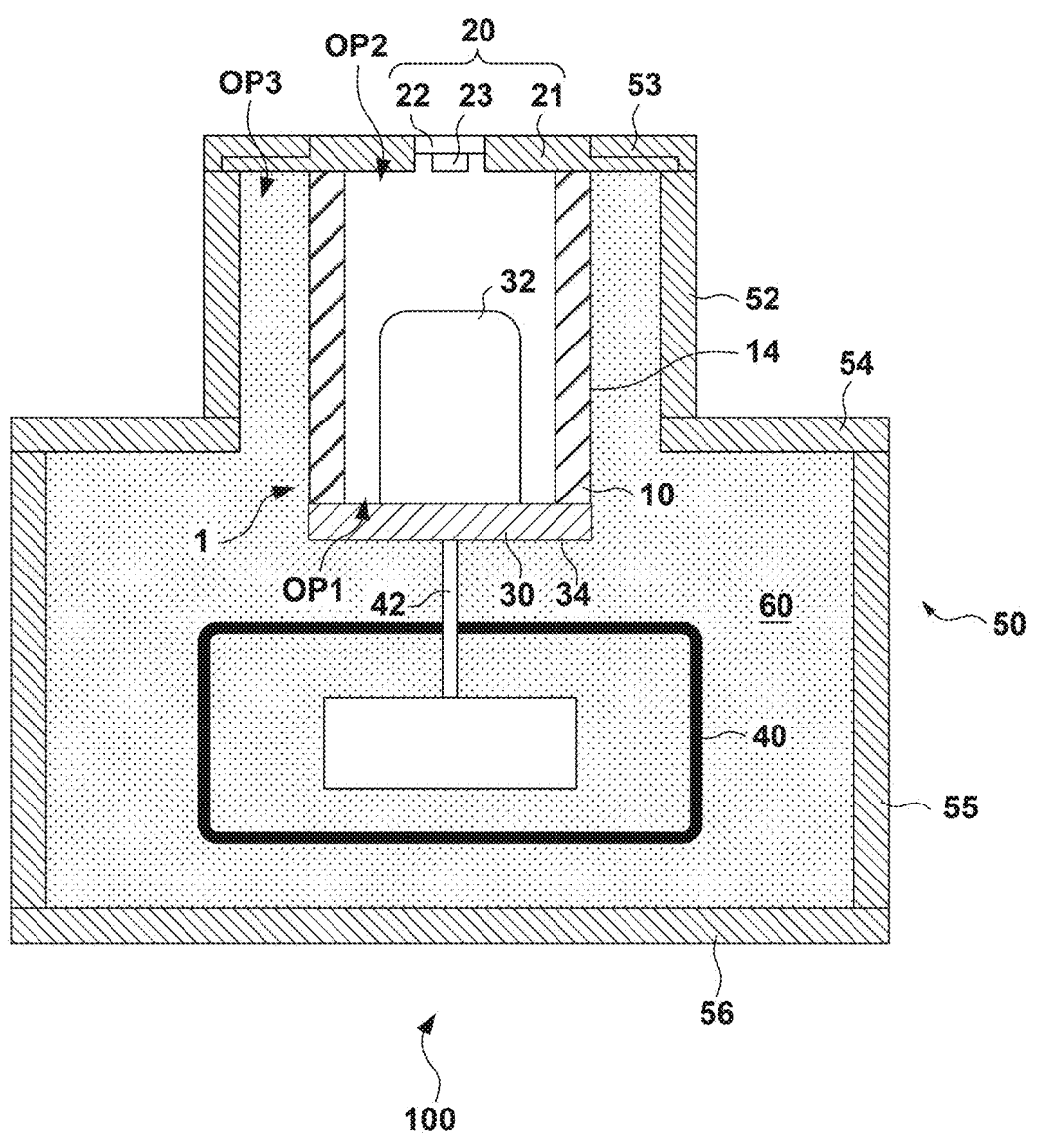
FIG. 1 is a view schematically showing the arrangement of a conventional X-ray generation apparatus for explaining the basic arrangement of an X-ray generation apparatus according to the present disclosure.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The basic arrangement of an X-ray generation apparatus 100 according to the present disclosure will be described first with reference to FIG. 1. The X-ray generation apparatus 100 can include an X-ray generation tube 1 and an accommodating container 50 that accommodates the X-ray generation tube 1. The X-ray generation apparatus 100 may further include a driving circuit 40 that drives the X-ray generation tube 1, and the driving circuit 40 is accommodated in the accommodating container 50 and can be connected to the X-ray generation tube 1 via a cable 42. A part (an anode 20 to be described later) of the X-ray generation tube 1 can be exposed to the external space of the accommodating container 50 (the external space of the X-ray generation apparatus 100). The internal space of the accommodating container 50 is filled with an insulating liquid 60. From another viewpoint, the internal space of the accommodating container 50 is filled with the insulating liquid 60 except for a space occupied by components (the X-ray generation tube 1, the cable 42, and the like) accommodated in the accommodating container 50. The insulating liquid 60 can be, for example, an insulating oil such as a mineral oil or a chemical synthetic oil. Alternatively, the insulating liquid 60 may be a liquid other than an insulating oil, for example, a fluorine-based inert liquid (for example, Fluorinert™).

The X-ray generation tube 1 can include an insulating tube 10, a cathode 30, and the anode 20. A vacuum is maintained in the internal space of the X-ray generation tube 1. The insulating tube 10 can have a first opening end OP1 and a second opening end OP2. The insulating tube 10 can have a tubular shape such as a cylindrical shape. The insulating tube 10 can be configured to provide vacuum airtightness and insulating properties of the internal space of the insulating tube 10. The insulating tube 10 can be made of, for example, a ceramic material mainly containing alumina or zirconia. Alternatively, the insulating tube 10 can be made of a glass material such as borosilicate glass.

The cathode 30 can be arranged to close the first opening end OP1 of the insulating tube 10. The cathode 30 includes an electron emitting portion 32. The cathode 30 may be arranged so as not to contact the insulating liquid 60. The X-ray generation apparatus 100 may be configured such that a member having the same potential as the cathode 30 does not contact the insulating liquid 60. The anode 20 can be arranged to close the second opening end OP2 of the insulating tube 10. The anode 20 can include a target 23 that generates X-rays when electrons from the electron emitting portion 32 collide therewith. The anode 20 can include a target holding plate 22 that holds the target 23, and an electrode 21 that supports the target holding plate 22. The electrode 21 is formed by a conductor, and is electrically connected to the target 23 to apply a potential to the target 23. The anode 20 and the accommodating container 50 can be maintained at, for example, the ground potential but may be maintained at another potential. The target 23 can be made of a material having a high melting point and high generation efficiency of X-rays, such as tungsten, tantalum, or molybdenum. The target holding plate 22 can be made of, for example, a material that can easily transmit X-rays, such as beryllium or diamond.

The accommodating container 50 can have a third opening end OP3. The accommodating container 50 can include, for example, a first portion 52, a second portion 53, a third portion 54, a fourth portion 55, and a fifth portion 56. The first portion 52 can have a tubular shape such as a cylindrical shape. The first portion 52 can define the third opening end OP3 of the accommodating container 50. In other words, the first portion 52 can include the third opening end OP3. The second portion 53 is formed by a conductor, and is electrically connected to the anode 20 of the X-ray generation tube 1. It may be understood that the second portion 53 forms the anode together with the electrode 21. The second portion 53 can have a ring shape or a frame shape. The second portion 53 can be arranged to contact the insulating liquid 60. Alternatively, a conductive member including the electrode 21 and the second portion 53 can be arranged to contact the insulating liquid 60. The electrode 21 and the second portion 53 may be formed as a single piece of the same material. The fourth portion 55 can have a tubular shape such as a cylindrical shape or a rectangular tubular shape. The third portion 54 is connected to one end of the fourth portion 55, and can have a ring shape or a frame shape. The first portion 52 can be connected to the third portion 54 to project from the third portion 54. The fifth portion 56 can be connected to the other end of the fourth portion 55. Alternatively, the third portion 54, the fourth portion 55, and the fifth portion 56 may be integrated to have a hollow spherical shape, except for the joint portion with the first portion 52.

Figure 7:
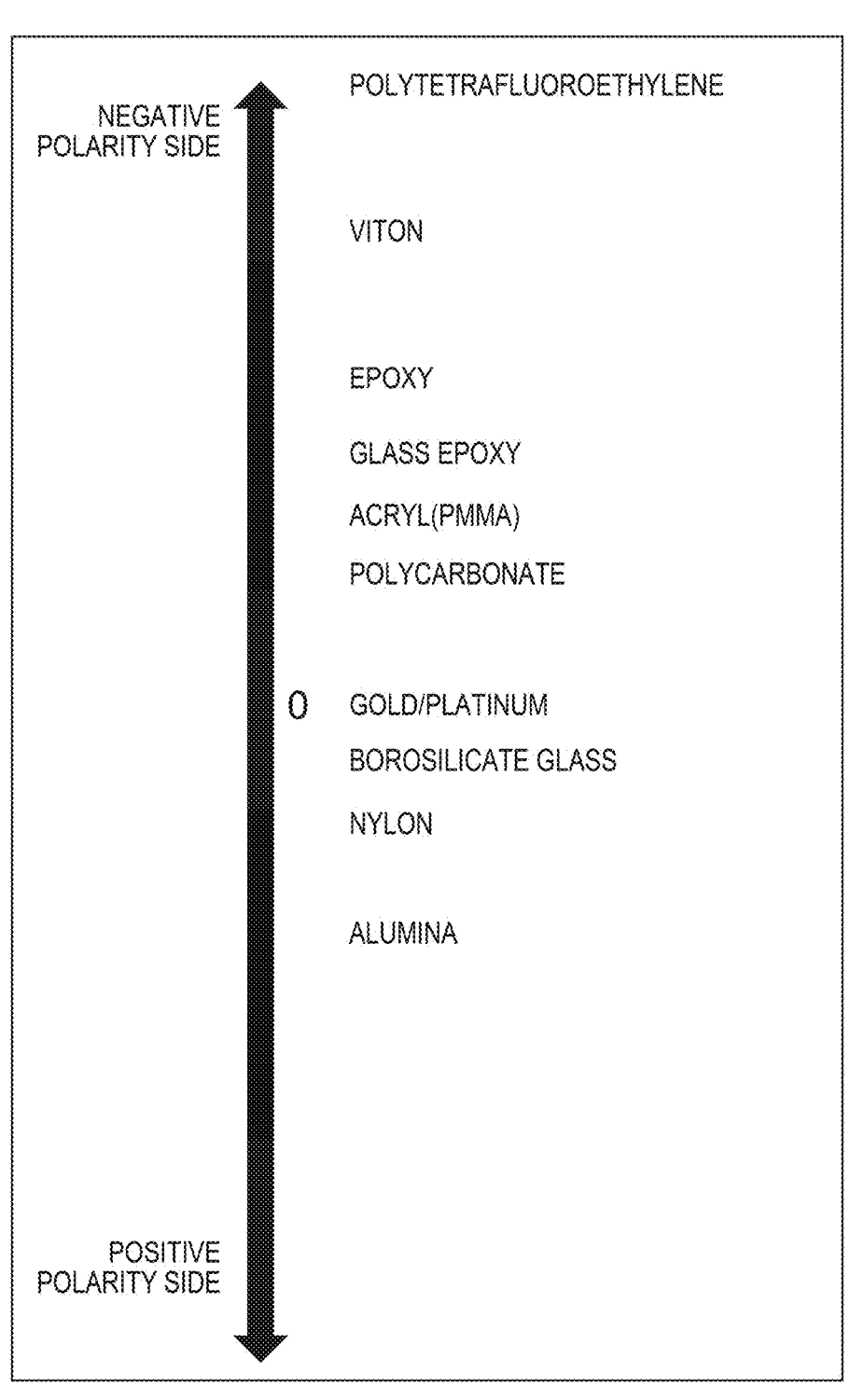
FIG. 7 is a view exemplifying a triboelectric series in triboelectrification with an insulating liquid.

The insulating liquid 60 can cause convection in the internal space of the accommodating container 50. When an entire outer surface 14 of the insulating tube 10 contacts the insulating liquid 60, the insulating tube 10 and the insulating liquid 60 can be charged by friction between the insulating liquid 60 and the outer surface 14 of the insulating tube 10. This charging is called triboelectrification. In general, triboelectrification indicates a phenomenon that friction between two different types of materials causes charges to move between the two types of materials, and thus one material is charged to positive polarity and the other material is charged to negative polarity. The present inventor performed an experiment of measuring the potential of the outer surface of the insulating tube by a surface electrometer after leaving the insulating tube in a convecting insulating oil (insulating liquid). As a result, it was confirmed that the outer surface of the insulating tube was charged to positive polarity and the amount of charge increased in proportion to the time. Charging polarity by friction depends on the characteristics of materials that are rubbed together. Examples of the characteristics of the materials are a triboelectric series and relative permittivity. FIG. 7 shows an example of a triboelectric series with respect to an insulating oil. The triboelectric series indicates positive polarity or negative polarity to which the rubbed material is charged and the ordering of easiness of charging. In the triboelectric series, a material located on the positive polarity side is readily charged to positive polarity and a material located on the negative polarity side is readily charged to negative polarity.

Figure 6:
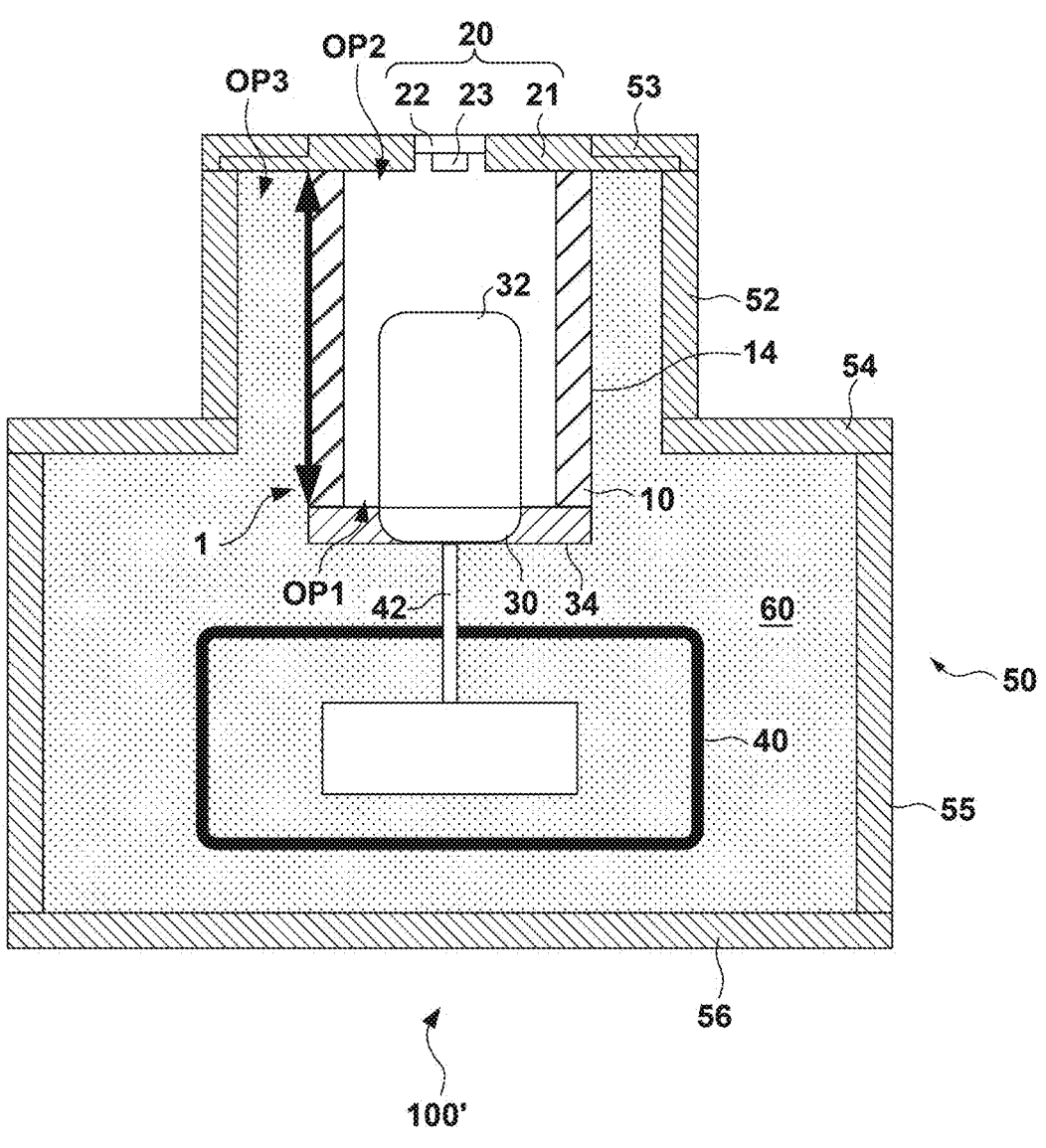
FIG. 6 is a view schematically showing the occurrence of abnormal discharge.

When the outer surface 14 of the insulating tube 10 is charged to positive polarity, the insulating performance between the cathode 30 and the anode 20 may lower. The insulating performance between the cathode 30 and the anode 20 may depend on a potential difference between the cathode 30 and the anode 20, resistance between the cathode 30 and the anode 20, a distance between the cathode 30 and the anode 20, and the like. As a result of the experiment, it was found that when the insulating tube 10 was charged to positive polarity, the cathode 30 and the anode 20 were short-circuited via the outer surface 14 of the insulating tube 10, as schematically indicated by a thick arrow in FIG. 6. In addition, as a result of the experiment, it was found that when the outer surface 14 of the insulating tube 10, the cathode 30, and the insulating liquid 60 formed a triple point, abnormal discharge readily occurred due to an electron avalanche.

The X-ray generation apparatus 100 of the present disclosure will exemplarily be described below through a plurality of embodiments shown in FIGS. 2, 3, 4, and 5. Matters not to be mentioned below can comply with the basic arrangement described with reference to FIG. 1.

Figure 2:
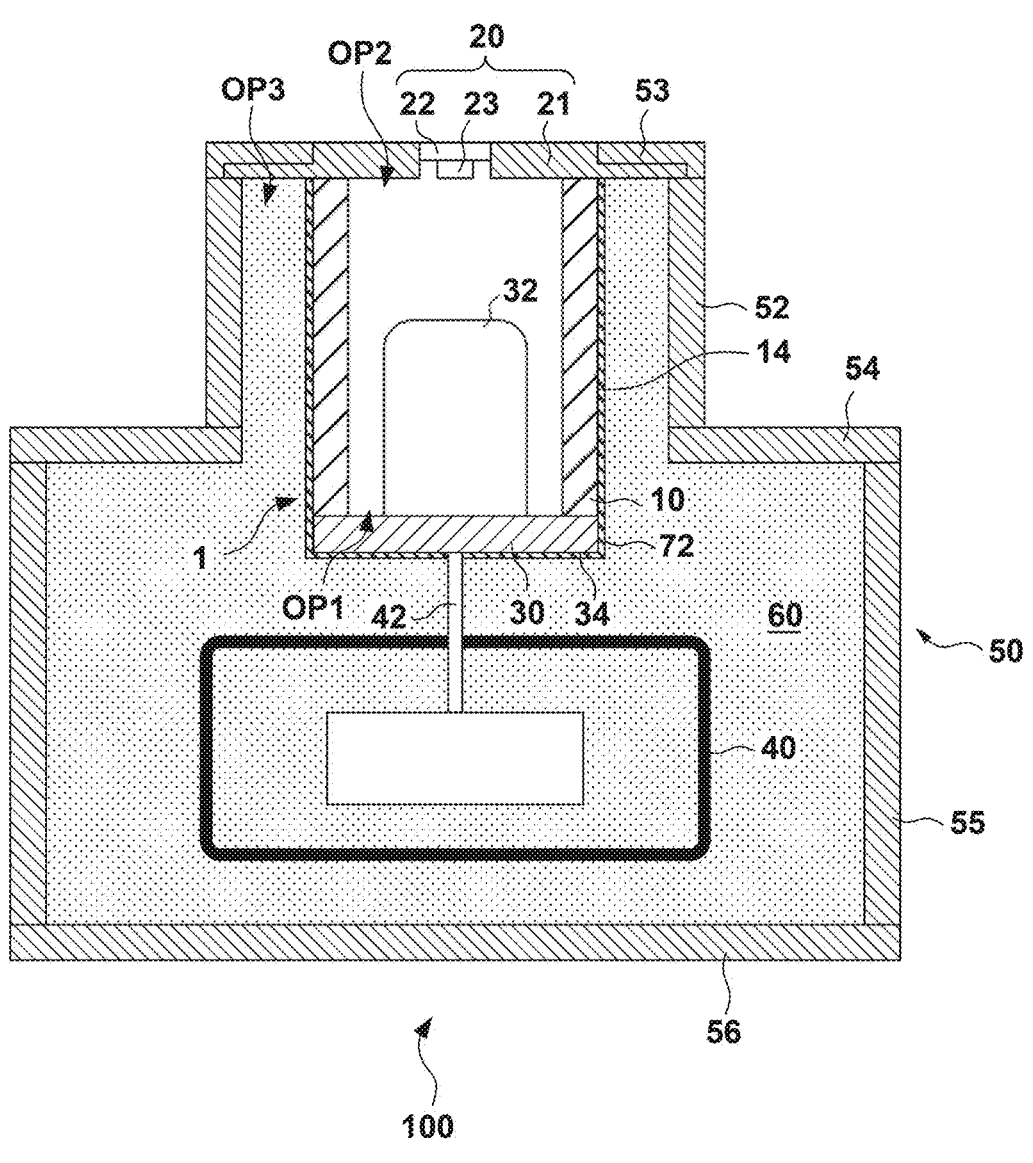
FIG. 2 is a view exemplarily and schematically showing the arrangement of an X-ray generation apparatus according to the first embodiment.

FIG. 2 exemplarily and schematically shows the arrangement of an X-ray generation apparatus 100 according to the first embodiment. An accommodating container 50 can be filled with an insulating liquid 60 to contact a part (for example, a second portion 53) of an anode and cover an outer surface 14 of an insulating tube 10 and an outer surface 34 of a cathode 30. In the X-ray generation apparatus 100 of the first embodiment, at least a part of the insulating tube 10 is surrounded by a member 72 so as to reduce abnormal discharge between the cathode 30 and an anode 20 via the insulating tube 10. The member 72 can be made of an insulating material. More specifically, in the X-ray generation apparatus 100 of the first embodiment, the entire region of the outer surface 14 of the insulating tube 10 can be surrounded by the member 72. From another viewpoint, the entire region of the outer surface 14 of the insulating tube 10 can be covered with the member 72. In addition to the entire region of the outer surface 14 of the insulating tube 10, the entire region of the outer surface 34 of the cathode 30 can be covered with the member 72. The first embodiment is effective in avoiding the outer surface 14 of the insulating tube 10, the cathode 30, and the insulating liquid 60 from forming a triple point, thereby making it possible to reduce the occurrence of abnormal discharge.

To reduce abnormal discharge between the cathode 30 and the anode 20 via the insulating tube 10, the material of the member 72 is decided so that triboelectrification between the member 72 and the insulating liquid 60 causes the member 72 to be charged to negative polarity and the insulating liquid 60 to be charged to positive polarity. In a case where an insulating oil is adopted as the insulating liquid 60, for example, the material of the member 72 can be selected so that triboelectrification between the member 72 and the insulating oil causes the member 72 to be charged to negative polarity in accordance with the triboelectric series exemplified in FIG. 7. As the material of the member 72, for example, polytetrafluoroethylene (Teflon™), PMMA (polymethyl methacrylate resin), epoxy, and fluorine rubber (for example, Viton™) are preferable. The member 72 is arranged to cover the entire region of the outer surface 14 of the insulating tube 10 and the entire region of the outer surface 34 of the cathode 30, and for example, a mold method, a spray method, a dip method, or the like can thus be applied.

To reduce abnormal discharge between the cathode 30 and the anode 20 via the insulating tube 10, the material of the member 72 can be decided so that a difference in relative permittivity between the member 72 and the insulating liquid 60 is smaller than a difference in relative permittivity between the member 72 and the insulating tube 10. For example, the member 72 is made of Viton having relative permittivity of 3 or polytetrafluoroethylene having relative permittivity of 2.1, and the insulating tube 10 is made of borosilicate glass having relative permittivity of 4.9 or alumina having relative permittivity of 9. The fact that a difference in relative permittivity between the member 72 and the insulating liquid 60 is smaller than a difference in relative permittivity between the member 72 and the insulating tube 10 may be evaluated at a temperature when generating X-rays or at room temperature (for example, 25° C.). However, there is no large difference between the former case and the latter case.

A mold method preferable to form the member 72 so as to cover an X-ray generation tube 1 (the outer surface 14 of the insulating tube 10 and the outer surface 34 of the cathode 30) will now be described. The material of the member 72, that is, the covering material is obtained by kneading a principal agent and a curing assistant in advance by a kneading device so as not to contain bubbles, and can be held at a constant temperature to maintain an appropriate flow. In a case of an epoxy-based resin, the temperature is, for example, about 100° C. but the temperature can appropriately be decided in accordance with the material to be used. The covering material can be poured into a container having a size larger than the X-ray generation tube 1 to be covered. At this time, the covering material can be cooled rapidly due to the temperature difference between the container and the covering material, thereby degrading liquidity of the covering material. To prevent this, the container is desirably heated in advance. After the covering material poured into the container is caused to overflow from the container, the covering material can be solidified at an appropriate cooling rate and temperature distribution not to cause a problem such as shrinkage.

In the X-ray generation tube 1, a high voltage is applied between the anode 20 and the cathode 30. Therefore, if a bubble having a small dielectric constant exists in the member 72 made of the covering material, the electric field is concentrated on the bubble, thereby inducing abnormal discharge. To avoid this, a space where processing of filling the covering material is performed can be exhausted in advance using a vacuum pump to obtain a vacuum degree of about several hundred to several thousand Pa. Furthermore, to improve adhesion between the covering material and the X-ray generation tube 1, the X-ray generation tube 1 may be covered with the member 72 after applying a primer material to the surface of the X-ray generation tube 1 or forming unevenness by blast processing. The thickness of the member 72 is desirably small from a viewpoint of heat dissipation of the X-ray generation tube 1. For example, the thickness of the member 72 is preferably 5 mm or less, and more preferably 3 mm or less. For example, the thickness of the member 72 is preferably 0.3 mm or more, and more preferably 0.5 mm or more.

Figure 3:
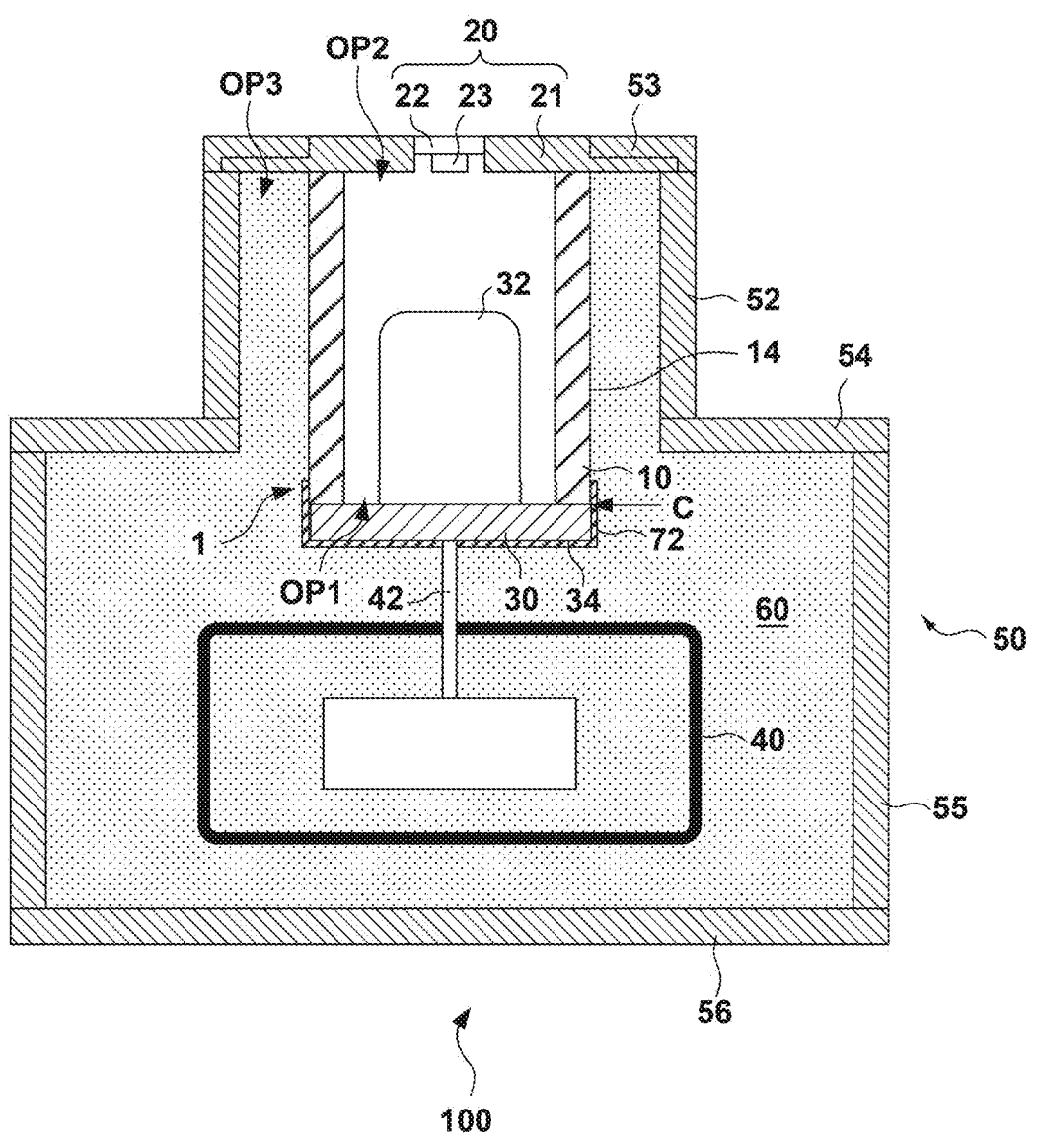
FIG. 3 is a view exemplarily and schematically showing the arrangement of an X-ray generation apparatus according to the second embodiment.

FIG. 3 exemplarily and schematically shows the arrangement of an X-ray generation apparatus 100 according to the second embodiment. Matters not mentioned as the second embodiment can comply with the first embodiment or the basic arrangement described with reference to FIG. 1. A member 72 can be arranged to cover a contact portion C between a cathode 30 and an insulating tube 10. Furthermore, the member 72 can be arranged to cover the cathode 30. The second embodiment is also effective in avoiding an outer surface 14 of the insulating tube 10, the cathode 30, and an insulating liquid 60 from forming a triple point, thereby making it possible to reduce the occurrence of abnormal discharge.

Figure 4:
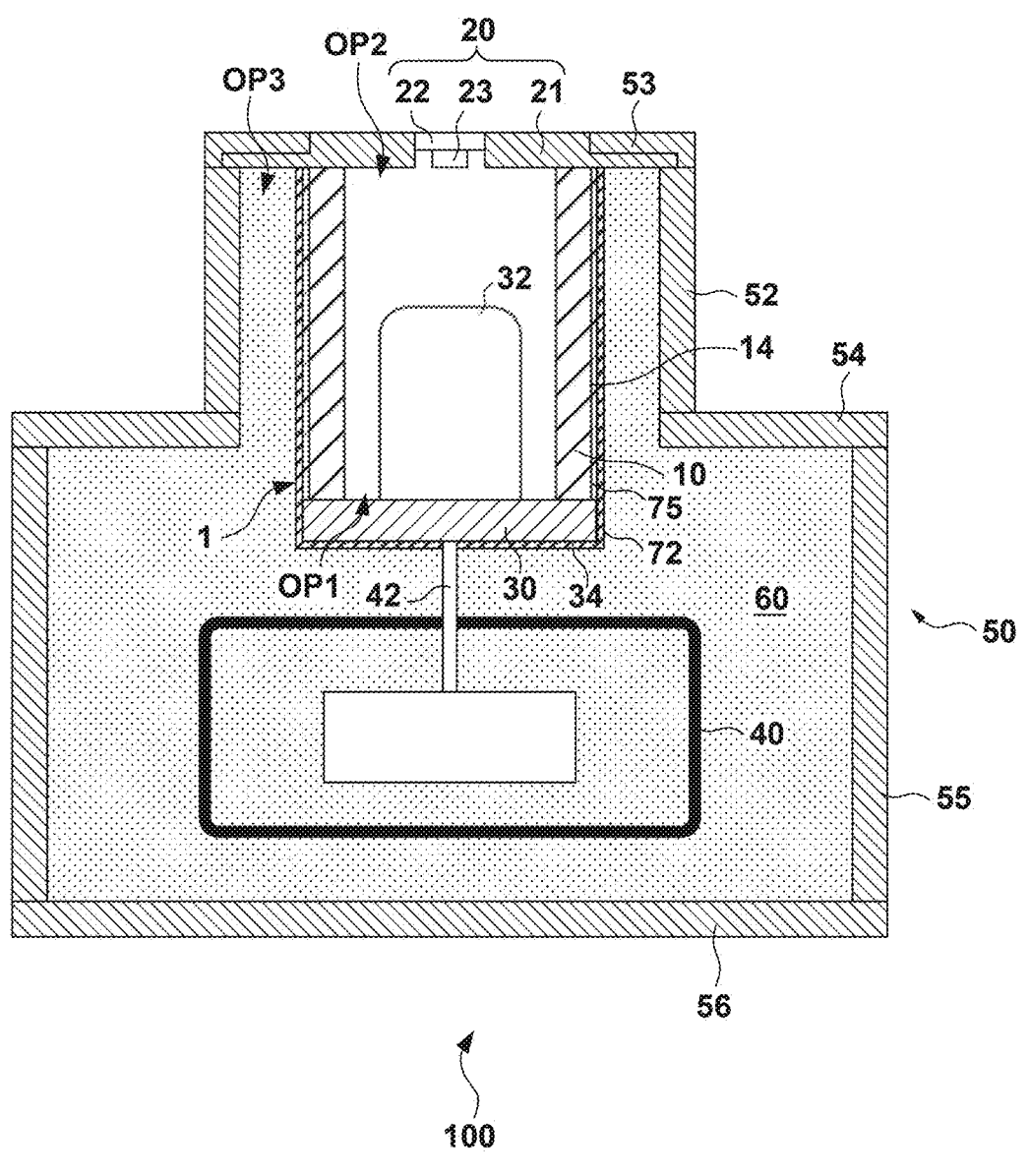
FIG. 4 is a view exemplarily and schematically showing the arrangement of an X-ray generation apparatus according to the third embodiment.

FIG. 4 exemplarily and schematically shows the arrangement of an X-ray generation apparatus 100 according to the third embodiment. Matters not mentioned as the third embodiment can comply with the first or second embodiment or the basic arrangement described with reference to FIG. 1. In the third embodiment, an intermediate layer 75 is provided between a member 72 and an insulating tube 10. The intermediate layer 75 can be made of an insulating material. The intermediate layer 75 can be configured to cover the insulating tube 10. The member 72 can be configured to cover the intermediate layer 75. The intermediate layer 75 can be made of at least one of, for example, Kovar glass, nylon, and a mixture containing a metal oxide that contains silica as a main component. Providing the intermediate layer 75 is advantageous in, for example, forming a smooth surface to cover an outer surface 14 of the insulating tube 10. Forming the intermediate layer 75 is advantageous in suppressing a foreign substance from entering between particles forming the insulating tube 10. As a result, it is possible to improve a creepage withstand voltage on the surface of the member 72 arranged to cover the insulating tube 10. This can prevent abnormal discharge, thereby increasing the life of the X-ray generation apparatus 100.

Figure 5:
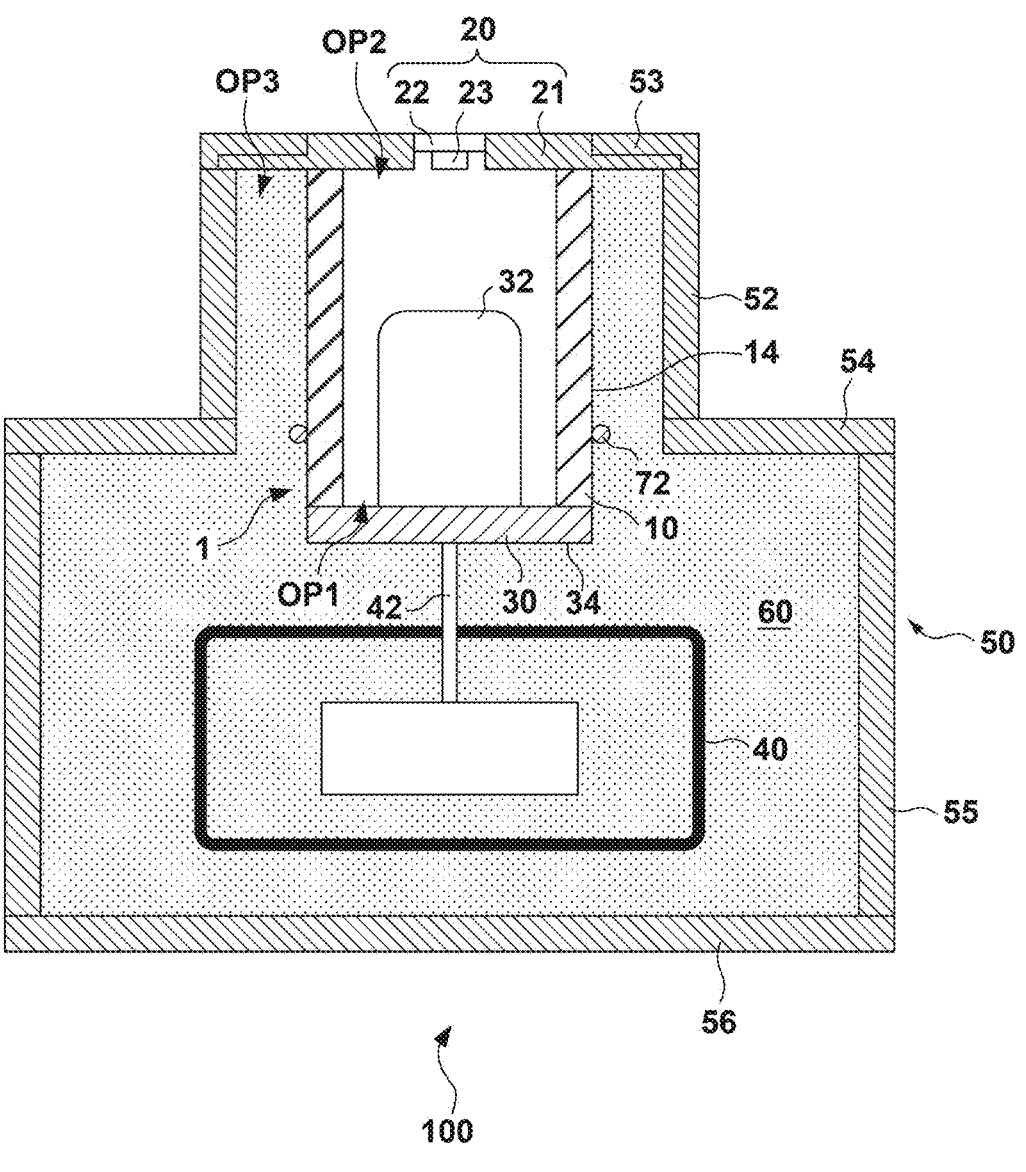
FIG. 5 is a view exemplarily and schematically showing the arrangement of an X-ray generation apparatus according to the fourth embodiment.

FIG. 5 exemplarily and schematically shows the arrangement of an X-ray generation apparatus 100 according to the fourth embodiment. Matters not mentioned as the fourth embodiment can comply with the first to third embodiments or the basic arrangement described with reference to FIG. 1. In the fourth embodiment, a member 72 can include a ring-shaped portion. Alternatively, the member 72 can be a ring-shaped portion. The ring-shaped portion can surround the whole circumference of a part in the axial direction (that is the axial direction of an insulating tube 10 and is also a direction in which an electron beam is emitted from an electron emitting portion 32) of an outer surface 14 of the insulating tube 10. The outer surface 14 of the insulating tube 10 can contact an insulating liquid 60 in a region other than the region surrounded by the member 72. The shortest distance between the member 72 and a cathode 30 is preferably smaller than the shortest distance between the member 72 and an anode 20. The insulating tube 10 may be surrounded by a plurality of members 72 (ring-shaped portions). The plurality of members 72 can be arranged apart from each other with respect to the axial direction of the insulating tube 10. The member 72 can be formed by, for example, Viton. Even if the outer surface 14 of the insulating tube 10 is charged to positive polarity, the amount of charge to positive polarity on the entire outer surface 14 of the insulating tube 10 can be reduced when the member 72 is charged to negative polarity. This can reduce the occurrence of abnormal discharge.

Figure 8:
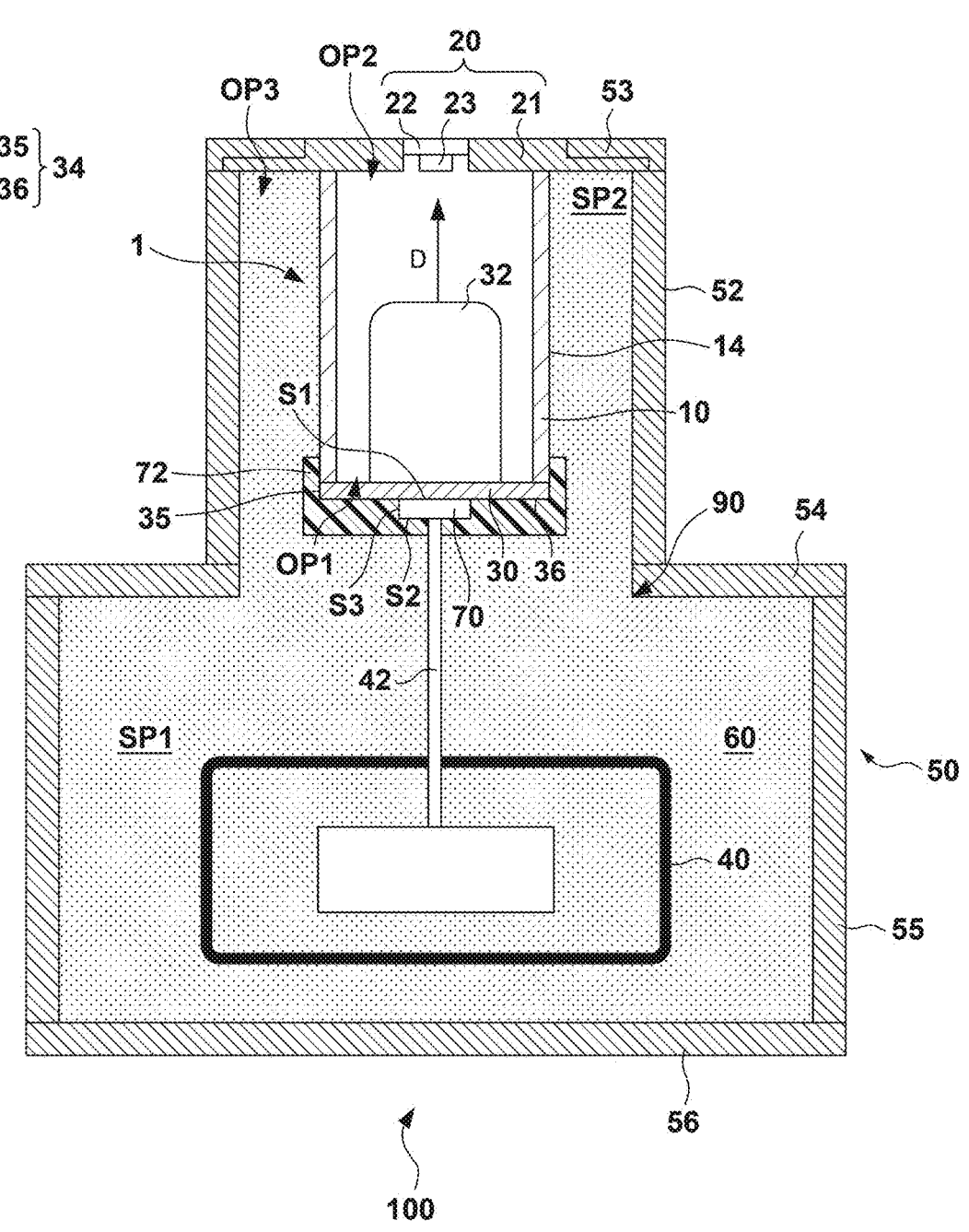
FIG. 8 is a view exemplarily and schematically showing the arrangement of an X-ray generation apparatus according to the fifth embodiment.

FIG. 8 exemplarily and schematically shows the arrangement of an X-ray generation apparatus 100 according to the fifth embodiment. Matters not mentioned as the fifth embodiment can comply with the first to fourth embodiments or the basic arrangement described with reference to FIG. 1.

An accommodating container 50 can define a first space SP1 storing a driving circuit 40, and a second space SP2 protruding from the first space SP1 and storing an X-ray generation tube 1. More specifically, a third portion 54, a fourth portion 55, and a fifth portion 56 of the accommodating container 50 can define the first space SP1. On the other hand, a first portion 52 and a second portion 53 of the accommodating container 50 can define the second space SP2. One end of the second space SP2 can form a third opening end OP3. The first portion 52 can form a protrusion portion protruding from the third portion 54.

The X-ray generation apparatus 100 can include an electronic component 70 arranged in proximity to a cathode 30. The driving circuit 40 can be configured to drive the X-ray generation tube 1 via the electronic component 70. The driving circuit 40 can be connected to the electronic component 70 via a cable 42. The electronic component 70 can include a protection circuit element, for example, a varistor (Variable Resistor) for protecting the cathode 30. The electronic component 70 can include an electric terminal connected to the cathode 30.

An insulating tube 10 can be arranged such that its entirety fits in the second space SP2. In other words, in a direction D in which an electron beam is emitted from an electron emitting portion 32, the length of the first portion 52 is larger than the length of the insulating tube 10. From another viewpoint, in the direction D in which an electron beam is emitted from the electron emitting portion 32, the length of the second space SP2 is larger than the length of the insulating tube 10. In this case, the cable 42 exists on a boundary between the first space SP1 and the second space SP2. In a section (FIG. 8) including the direction D in which an electron beam is emitted (the axis of the X-ray generation tube 1), the second portion 52 or the third portion 54 of the accommodating container 50 can include a convex portion 90 protruding toward the interior of the accommodating container 50.

The X-ray generation tube 1 can be arranged such that its entirety fits in the second space SP2. The cathode 30 can be arranged such that its entirety fits in the second space SP2. An outer surface 34 of the cathode 30 can include a cylindrical side surface 35 and a circular bottom surface 36. In the axial direction of the insulating tube 10 or the direction D in which an electron beam is emitted from the electron emitting portion 32, the cylindrical side surface 35 has a non-zero dimension. The bottom surface 36 of the outer surface 34 of the cathode 30 can face the driving circuit 40. In the radial direction of the insulating tube 10 or a direction orthogonal to the direction D in which an electron beam is emitted from the electron emitting portion 32, the bottom surface 36 has a non-zero dimension.

In the fifth embodiment, compared to the first to fourth embodiments, the distance between the cathode 30 and the first portion 52 is small. Therefore, abnormal discharge can occur between the cathode 30 and the first portion 52 to which the ground potential can be applied. To prevent this, at least a part or preferably the entirety of the side surface 35 of the outer surface 34 of the cathode 30, which is closest to the first portion 52, can be surrounded by a member 72. The member 72 can be made of an insulating material. The member 72 is arranged spaced apart from the accommodating container 50. The member 72 can be arranged to surround at least a part of an outer surface 14 of the insulating tube 10, and preferably the entire outer surface 14 of the insulating tube 10, in addition to the side surface 35 of the cathode 30. This can prevent abnormal discharge between the first portion 52 and the cathode 30.

The member 72 can be arranged to cover the electronic component 70 in addition to the outer surface 34 of the cathode 30. The electronic component 70 can have a first surface S1 which contacts the bottom surface 36 of the cathode 30, a second surface S2 on the opposite side of the first surface S1, and a third surface S3 connecting the first surface S1 and the second surface S2. The member 72 can be arranged to cover the second surface S2 and the third surface S3 of the electronic component 70. The member 72 can have a hole which allows the cable 42 to pass therethrough. When the member 72 covers the entire electronic component 70, the member 72 contacts the entire electronic component 70 to surround it, or the member 72 covers the second surface S2 and the third surface S3 of the electronic component 70, abnormal discharge between the electronic component 70 and the first portion 52 can be prevented.

The member 72 may be arranged to cover at least a part of the outer surface 14 of the insulating tube 10 in addition to the side surface 35 of the cathode 30. Alternatively, the member 72 may be arranged to cover the entire outer surface 14 of the insulating tube 10 in addition to the side surface 35 of the cathode 30. Here, the member 72 can be a continuous member that covers the side surface 35 of the cathode 30 and the outer surface 14 of the insulating tube 10. The arrangement in which the member 72 entirely or partially covers the outer surface 14 of the insulating tube 10 is advantageous in improving the insulating performance between the cathode 30 and an anode 20.

In the fifth embodiment, an insulation measure may also be taken between the cathode 30 and the anode 20, as in the first and fourth embodiments.

Figure 9:
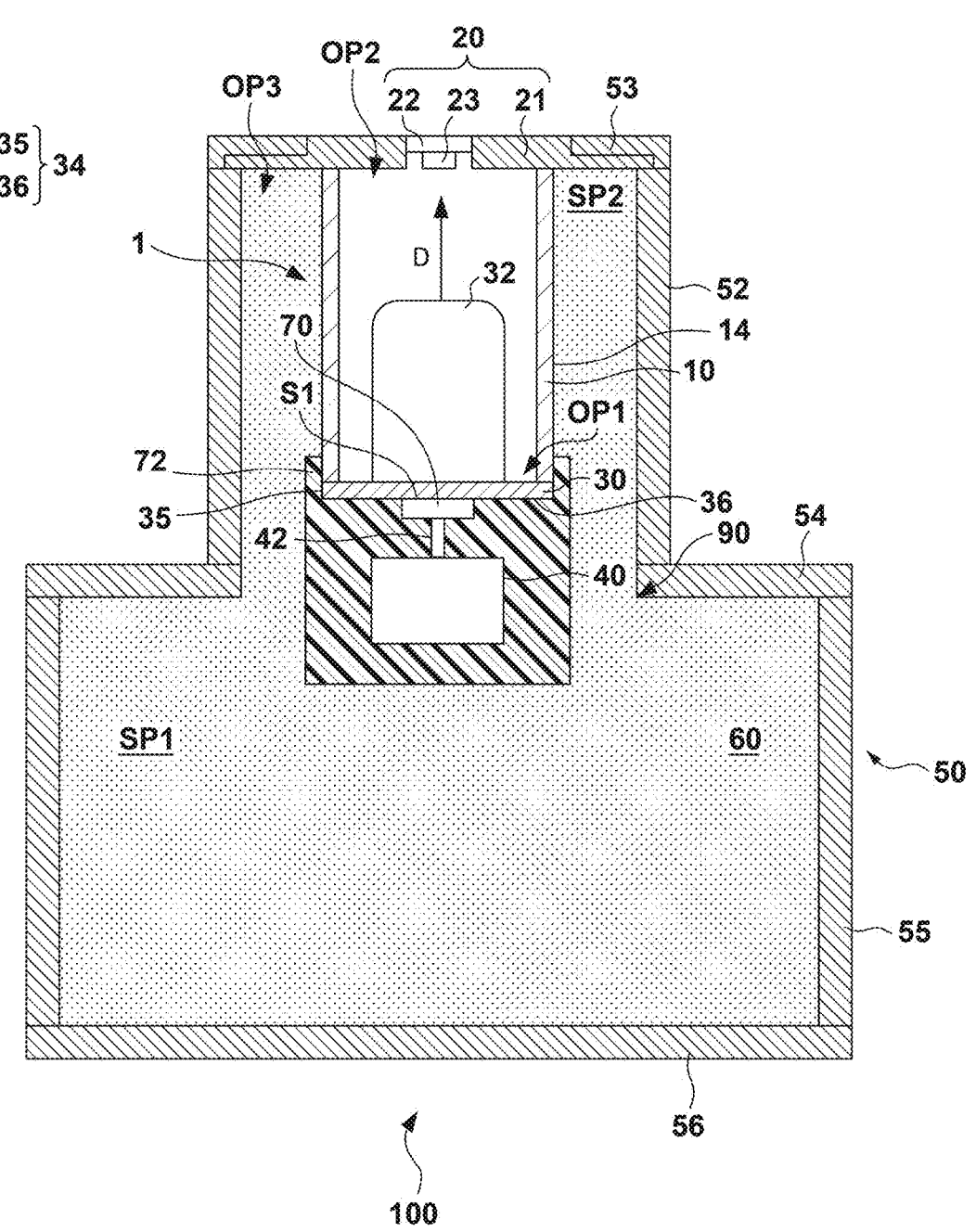
FIG. 9 is a view exemplarily and schematically showing the arrangement of an X-ray generation apparatus according to the sixth embodiment.

FIG. 9 exemplarily and schematically shows the arrangement of an X-ray generation apparatus 100 according to the sixth embodiment. Matters not mentioned as the sixth embodiment can comply with the first to fourth embodiments or the basic arrangement described with reference to FIG. 1. The sixth embodiment also has an aspect as a modification of the fifth embodiment.

An accommodating container 50 can define a first space SP1 storing a driving circuit 40, and a second space SP2 protruding from the first space SP1 and storing an X-ray generation tube 1. More specifically, a third portion 54, a fourth portion 55, and a fifth portion 56 of the accommodating container 50 can define the first space SP1. On the other hand, a first portion 52 and a second portion 53 of the accommodating container 50 can define the second space SP2. One end of the second space SP2 can form a third opening end OP3. The first portion 52 can form a protrusion portion protruding from the third portion 54. The entire driving circuit 40 may be arranged in the first space SP1, or a part of the driving circuit 40 may be arranged in the first space SP1. In a case where a part of the driving circuit 40 is arranged in the first space SP1, the other part of the driving circuit 40 can be arranged in the second space SP2.

An insulating tube 10 can be arranged such that its entirety fits in the second space SP2. In other words, in a direction D in which an electron beam is emitted from an electron emitting portion 32, the length of the first portion 52 is larger than the length of the insulating tube 10. From another viewpoint, in the direction D in which an electron beam is emitted from the electron emitting portion 32, the length of the second space SP2 is larger than the length of the insulating tube 10. In this case, a cable 42 may or may not exist on a boundary between the first space SP1 and the second space SP2. In a section (FIG. 9) including the direction D in which an electron beam is emitted (the axis of the X-ray generation tube 1), the second portion 52 or the third portion 54 of the accommodating container 50 can include a convex portion 90 protruding toward the interior of the accommodating container 50.

The X-ray generation tube 1 can be arranged such that its entirety fits in the second space SP2. A cathode 30 can be arranged such that its entirety fits in the second space SP2. An outer surface 34 of the cathode 30 can include a cylindrical side surface 35 and a circular bottom surface 36. In the axial direction of the insulating tube 10 or the direction D in which an electron beam is emitted from the electron emitting portion 32, the cylindrical side surface 35 has a non-zero dimension. The bottom surface 36 of the outer surface 34 of the cathode 30 can face the driving circuit 40. In the radial direction of the insulating tube 10 or a direction orthogonal to the direction D in which an electron beam is emitted from the electron emitting portion 32, the bottom surface 36 has a non-zero dimension.

The outer surface 34 of the cathode 30 and the driving circuit 40 can be covered with an insulating member 73 arranged spaced apart from the accommodating container 50. An insulating liquid 60 exists between the insulating member 73 and the accommodating container 50. A cable 42 connecting the driving circuit 40 and the X-ray generation tube 1 can also be covered with the insulating member 73.

The X-ray generation apparatus 100 may include an electronic component 70 arranged in proximity to the cathode 30. The driving circuit 40 can be configured to drive the X-ray generation tube 1 via the electronic component 70. The driving circuit 40 can be connected to the electronic component 70 via the cable 42. The electronic component 70 can include a protection circuit element, for example, a varistor (Variable Resistor) for protecting the cathode 30. The electronic component 70 can include an electric terminal connected to the cathode 30.

The insulating member 73 can be arranged to cover the electronic component 70 in addition to the outer surface 34 of the cathode 30. The electronic component 70 can have a first surface S1 which contacts the bottom surface 36 of the cathode 30, a second surface S2 on the opposite side of the first surface S1, and a third surface S3 connecting the first surface S1 and the second surface S2. The insulating member 73 can be arranged such that the insulating member 73 covers the entire electronic component 70, the insulating member 73 contacts the entire electronic component 70 to surround it, or the insulating member 73 covers the second surface S2 and the third surface S3 of the electronic component 70.

Furthermore, the insulating member 73 may be arranged to cover at least a part of an outer surface 14 of the insulating tube 10. Alternatively, the insulating member 73 may be arranged to cover the entire outer surface 14 of the insulating tube 10. Here, the insulating member 73 can continuously cover the side surface 35 of the cathode 30 and the outer surface 14 of the insulating tube 10. The arrangement in which the member 72 entirely or partially covers the outer surface 14 of the insulating tube 10 is advantageous in improving the insulating performance between the cathode 30 and an anode 20.

In the sixth embodiment, an insulation measure may also be taken between the cathode 30 and an anode 20, as in the first and fourth embodiments.

Figure 10:
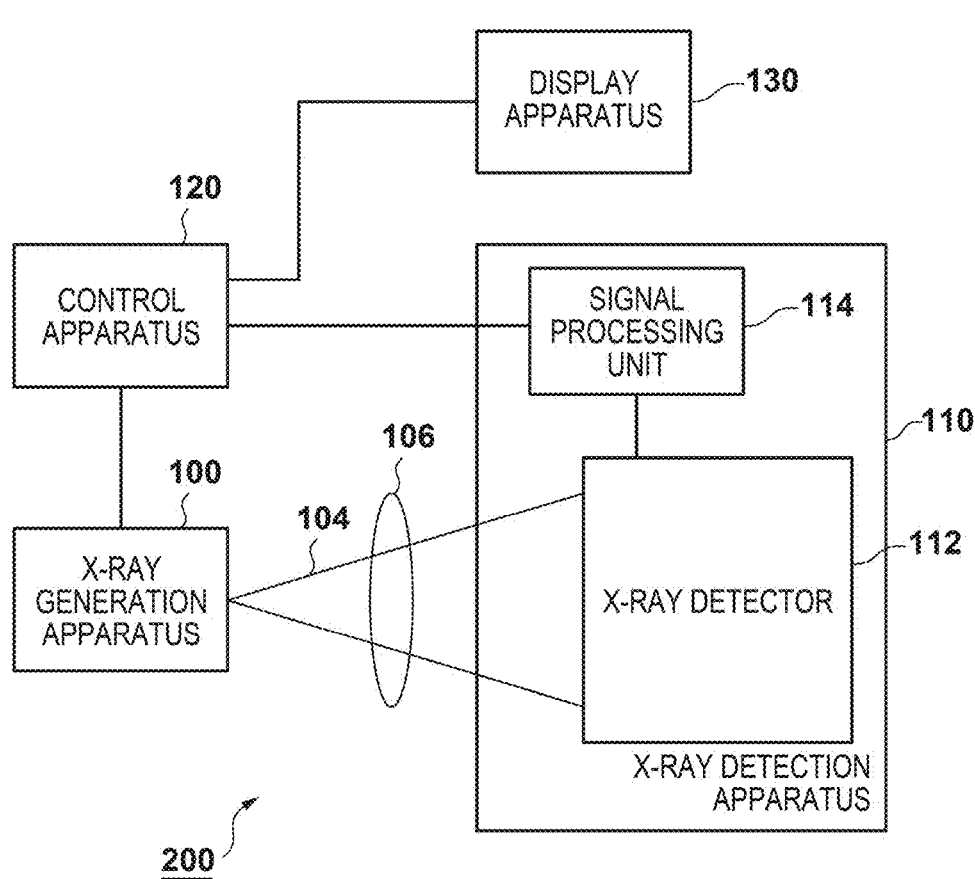
FIG. 10 is a block diagram showing the arrangement of an X-ray imaging apparatus according to an embodiment.

FIG. 10 shows the arrangement of an X-ray imaging apparatus 200 according to an embodiment. The X-ray imaging apparatus 200 can include an X-ray generation apparatus 100, and an X-ray detection apparatus 110 that detects X-rays 104 emitted from the X-ray generation apparatus 100 and transmitted through an object 106. The X-ray imaging apparatus 200 may further include a control apparatus 120 and a display apparatus 130. The X-ray detection apparatus 110 can include an X-ray detector 112 and a signal processing unit 114. The control apparatus 120 can control the X-ray generation apparatus 100 and the X-ray detection apparatus 110. The X-ray detector 112 detects or images the X-rays 104 emitted from the X-ray generation apparatus 100 and transmitted through the object 106. The signal processing unit 114 can process a signal output from the X-ray detector 112, and supply the processed signal to the control apparatus 120. The control apparatus 120 displays an image on the display apparatus 130 based on the signal supplied from the signal processing unit 114.

The present invention is not limited to the above embodiments and various changes and modifications can be made within the spirit and scope of the present invention. Therefore, to apprise the public of the scope of the present invention, the following claims are made.

The invention claimed is:

1. An X-ray generation apparatus comprising:
an X-ray generation tube including an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide;
an electronic component having an electronic terminal electrically connected to the cathode, the electronic component being arranged in proximity to the cathode;
a driving circuit configured to drive the X-ray generation tube via the electronic component;
an accommodating container configured to accommodate the X-ray generation tube, the electronic component, and the driving circuit; and
a member arranged to contact an outer surface of the cathode and the electronic component, the member being arranged spaced apart from the accommodating container; and
wherein the accommodating container has a third opening end, and the X-ray generation tube is arranged to close the third opening end,
the accommodating container is filled with an insulating liquid,
the accommodating container defines a first space storing at least a part of the driving circuit, and a second space protruding from the first space and storing the X-ray generation tube and the electronic component,
the accommodating container includes a protrusion portion surrounding the second space, and one end of the second space forms the third opening end.

2. The X-ray generation apparatus according to claim 1, wherein
the outer surface of the cathode includes a cylindrical side surface and a circular bottom surface,
the electronic component has a first surface which contacts the bottom surface, a second surface on an opposite side of the first surface, and a third surface connecting the first surface and the second surface, and
the member contacts the outer surface of the cathode, and the second surface and the third surface of the electronic component.

3. The X-ray generation apparatus according to claim 2, wherein
the second surface of the electronic component and the driving circuit are connected by a cable.

4. The X-ray generation apparatus according to claim 1, wherein
the member contacts the driving circuit in addition to the outer surface of the cathode and the electronic component.

5. The X-ray generation apparatus according to claim 1, wherein
the member further contacts at least a part of an outer surface of the insulating tube.

6. The X-ray generation apparatus according to claim 1, wherein
the entire X-ray generation tube is arranged in the second space.

7. The X-ray generation apparatus according to claim 1, wherein
a part of the driving circuit is arranged in the first space.

8. The X-ray generation apparatus according to claim 7, wherein
the other part of the driving circuit is arranged in the second space.

9. The X-ray generation apparatus according to claim 1, wherein
the insulating liquid exists between the member and the accommodating container.

10. The X-ray generation apparatus according to claim 1, wherein
the member is made of an insulating material.

11. The X-ray generation apparatus according to claim 1, wherein
the electronic component includes a varistor.

12. An X-ray generation apparatus comprising:
an X-ray generation tube including an insulating tube with a first opening end and a second opening end, a cathode arranged to close the first opening end of the insulating tube and including an electron emitting portion, and an anode arranged to close the second opening end and including a target that generates X-rays when electrons from the electron emitting portion collide;
a driving circuit configured to drive the X-ray generation tube;
an accommodating container configured to accommodate the X-ray generation tube and the driving circuit; and
an insulating member arranged to contact an outer surface of the cathode and the driving circuit, the insulating member being arranged spaced apart from the accommodating container; and
wherein the accommodating container has a third opening end, and the X-ray generation tube is arranged to close the third opening end,
the accommodating container is filled with an insulating liquid such that the insulating liquid exists between the insulating member and the accommodating container,
the accommodating container defines a first space storing a part of the driving circuit, and a second space protruding from the first space and storing the X-ray generation tube,
the accommodating container includes a protrusion portion surrounding the second space, and one end of the second space forms the third opening end.

13. The X-ray generation apparatus according to claim 1, wherein
the insulating liquid is an insulating oil.

14. The X-ray generation apparatus according to claim 1, wherein
the insulating liquid is a fluorine-based inert liquid.

15. An X-ray imaging apparatus comprising:

an X-ray generation apparatus defined in claim 1; and an X-ray detector configured to detect X-rays emitted from the X-ray generation apparatus.

16. The X-ray generation apparatus according to claim 1, wherein the cathode is arranged so as not to contact the insulating liquid.

17. The X-ray generation apparatus according to claim 12, wherein the cathode is arranged so as not to contact the insulating liquid.

\* \* \* \* \*